(12) United States Patent
Miller et al.

(10) Patent No.: US 11,591,003 B2
(45) Date of Patent: Feb. 28, 2023

(54) STOWABLE STEERING COLUMN

(71) Applicants: thyssenkrupp Presta AG, Eschen (LI); thyssenkrupp AG, Essen (DE)

(72) Inventors: Marvin Miller, Tipton, IN (US); Bryce Welch, Indianapolis, IN (US); Christian Pichonnat, Indianapolis, IN (US)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 302 days.

(21) Appl. No.: 17/060,252

(22) Filed: Oct. 1, 2020

(65) Prior Publication Data

US 2022/0105976 A1  Apr. 7, 2022

(51) Int. Cl.
*B62D 1/183* (2006.01)
*B62D 1/184* (2006.01)
*F16D 1/10* (2006.01)
*B62D 1/181* (2006.01)

(52) U.S. Cl.
CPC ............. *B62D 1/183* (2013.01); *B62D 1/184* (2013.01); *B62D 1/181* (2013.01); *F16D 1/10* (2013.01); *F16D 2001/103* (2013.01)

(58) Field of Classification Search
CPC ........ B62D 1/183; B62D 1/184; B62D 1/181; F16D 1/10; F16D 2001/103
See application file for complete search history.

(56) References Cited

U.S. PATENT DOCUMENTS

| | | | | |
|---|---|---|---|---|
| 3,926,532 A | * | 12/1975 | Schlenker | F16D 1/116 403/322.2 |
| 3,962,931 A | * | 6/1976 | Moneta | B62D 1/185 74/531 |
| 4,317,387 A | * | 3/1982 | Myers | F16B 7/105 403/328 |
| 5,342,091 A | * | 8/1994 | Hancock | F16F 7/125 74/492 |
| 10,351,161 B2 | | 7/2019 | Buzzard | |
| 10,370,022 B2 | | 8/2019 | Magnus | |
| 2010/0242665 A1 | * | 9/2010 | Nagamura | B60R 25/0211 70/184 |
| 2017/0241472 A1 | | 8/2017 | Walser | |
| 2017/0369091 A1 | | 12/2017 | Nash | |

(Continued)

FOREIGN PATENT DOCUMENTS

DE      102018127099 A    4/2020

*Primary Examiner* — Darlene P Condra
(74) *Attorney, Agent, or Firm* — thyssenkrupp North America, LLC

(57) ABSTRACT

A steering column has a housing. A steering spindle jacket is disposed within the housing. An outer steering spindle is disposed within the steering spindle jacket and has a spline hub. An inner spindle is disposed within the outer steering spindle and includes a spline shaft configured to permit axial movement and prevent rotation of the outer steering spindle when the spline hub and the spline shaft are engaged. In a non-stowed state the spline shaft and the spline hub are engaged and in a stowed state the spline shaft and the spline hub are free of engagement. A pin is disposed in the housing engages the spline hub portion in the stowed state and prevents rotation of the outer steering spindle and is free of engagement in the non-stowed state.

12 Claims, 8 Drawing Sheets

(56) References Cited

U.S. PATENT DOCUMENTS

| | | | |
|---|---|---|---|
| 2018/0001845 A1* | 1/2018 | Orihara | B62D 1/187 |
| 2018/0029627 A1* | 2/2018 | Sugishita | B62D 1/184 |
| 2019/0276070 A1* | 9/2019 | Klinger | B62D 15/0285 |
| 2022/0001914 A1* | 1/2022 | Kakita | B62D 1/185 |

* cited by examiner

STOWABLE STEERING COLUMN

FIELD

The present invention relates to stowable steering column assemblies for motor vehicles.

BACKGROUND

The steering column is primarily a supported shaft that connects a steering wheel to a gear unit that in turn causes steering wheels of the vehicle to turn responsive to user input. Typically, such steering columns use one or more of mechanical or hydraulic systems, an electromechanical steering system, or a steer-by-wire system, for example. Engineers and vehicle designers have improved the ergonomics of vehicles by providing adjustable steering columns with manual or motorized tilting and telescoping adjustability to increase fitting options for automotive vehicle users and to allow easy ingress and egress of the vehicle. It is increasingly desirable to provide more ways to address the comfort of users.

There is a need, therefore, to provide steering column features that increase vehicle user comfort, convenience, and safety. The present invention satisfies the need.

SUMMARY

An aspect of the present disclosure contemplates a steering column for a vehicle with a housing. A steering spindle jacket is disposed within the housing. The steering spindle jacket is movable axially within the housing. An outer steering spindle is disposed at least in part within the steering spindle jacket. The outer steering spindle is configured to attach to a steering wheel at a proximal end thereof and includes a spline hub portion opposite the proximal end. An inner spindle is disposed at least in part within the outer steering spindle. The inner spindle includes a spline shaft portion shaped and sized to permit axial movement and prevent rotation of the outer steering spindle relative to the inner spindle when the spline hub portion and the spline shaft portions are engaged. In a non-stowed state of the steering column the spline shaft portion and the spline hub portion are engaged. In a stowed state of the steering column the spline shaft portion and the spline hub portion are free of engagement. A pin is disposed in the housing so as to engage the spline hub portion in the stowed state and prevent rotation of the outer steering spindle and free of engagement with the spline hub portion in the non-stowed state.

In other aspects of the disclosure, the outer steering spindle may include an expanded portion that is sized and shaped to receive the spline shaft portion when in the stowed state. The expanded portion of the outer steering spindle may have an inner radius that is greater than an outer diameter of the spline shaft portion. The expanded portion may be proximal relative to the spline hub portion. The spline shaft hub may include internal toothing and at least one external groove. The spline shaft hub may include a plurality of external grooves. The pin is sized and shaped to engage with the at least one external groove and prevent rotation of the outer steering spindle. The pin may have a tooth portion that has a complementary shape to the at least one external groove. The pin may have a tooth portion that includes one or both of a chamfer and a rounded edge. The steering spindle jacket housing is movable axially within the housing. The outer steering spindle is configured to move axially with the steering spindle jacket. The outer steering spindle is configured to rotate within the steering spindle jacket.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

For purposes of the description hereinafter, the terms "upper, lower, right, left, vertical, horizontal, top, bottom, lateral, axial, radial, longitudinal" and other terms of orientation, movement, or position and derivatives thereof, shall relate to the invention as it is depicted in the figures and/or as one with skill in the art would use such terms. The term "configured" or "configuration" will be understood as referring to a structural size and/or shape. It is to be understood that the invention may assume alternative variations and step sequences, except where expressly specified to the contrary. It is also to be understood that the specific systems and processes illustrated in the attached drawings, and described in the following specification, are exemplary examples of the invention. Hence, specific dimensions and other physical characteristics related to the examples disclosed herein are not to be considered as limiting.

Figure 1:
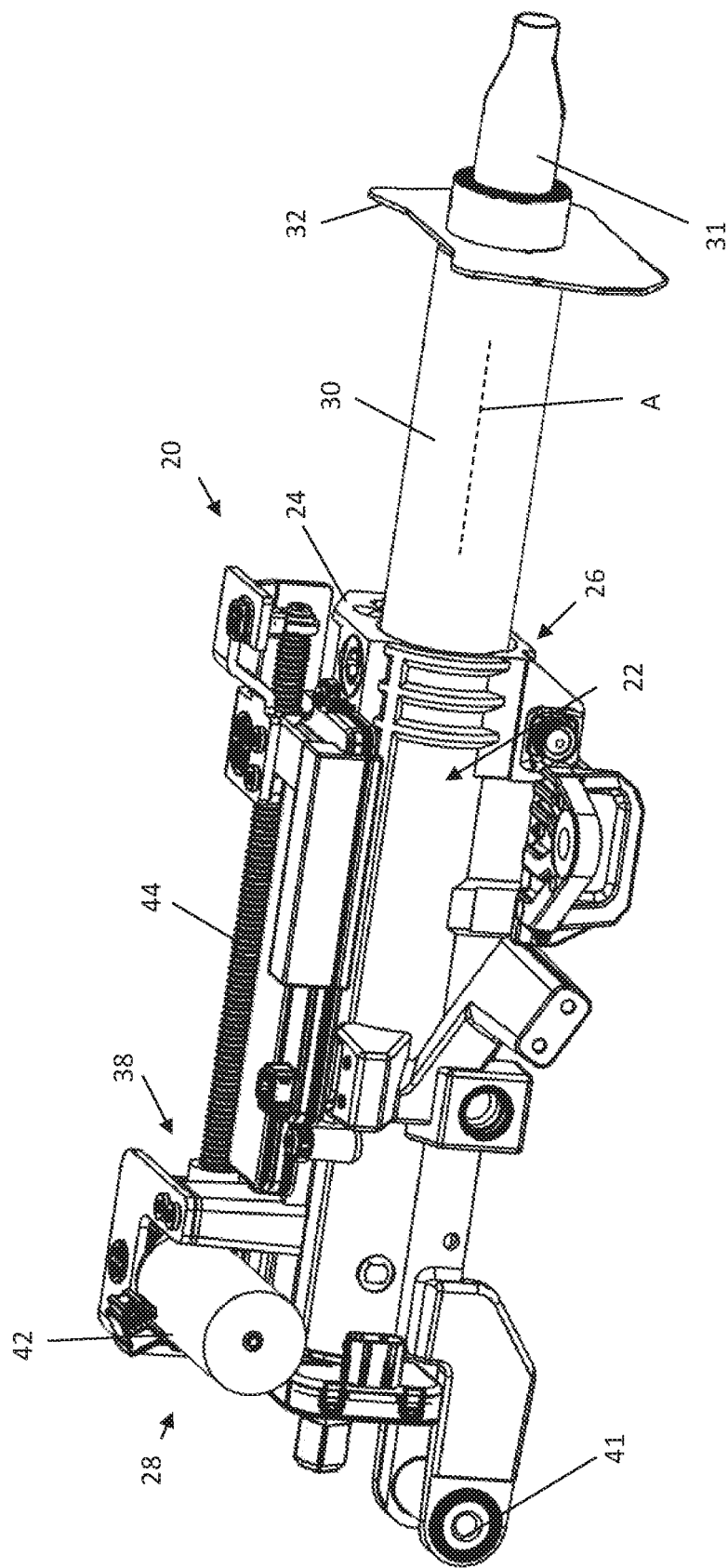
FIG. 1 is a perspective view of a steering column.

An example of a steering column 20 according to the disclosure is shown in FIG. 1. In general, the steering column 20 generally includes a number of subassemblies. The steering column 20 includes a support assembly 22 which may be referred to as a rocker box, which is configured to attach to a vehicle (not shown), such as an automobile or any suitable vehicle, and preferably to a frame of the vehicle. The support assembly 22 will be understood to include a conventional framework and/or housing 24 or multiple such elements configured to hold the steering column 20 to a vehicle frame and accommodate subassemblies that are attached thereto or operatively associated therewith as will explained herein. Such support assemblies are formed of metal or any suitable material. For purposes of orientation, the support assembly 22 includes a proximal end 26 that is disposed nearest to the user of the steering column 20 and a distal end 28 that is disposed away from the user relative to the proximal end, wherein the user of the vehicle may be considered the operator or driver of the vehicle.

The support assembly 22 is shaped and sized to receive a steering spindle jacket 30. The steering spindle jacket 30 is received within the support assembly 22 and may extend from the proximal end 26 and is configured to move in and out of the support assembly along axis A. The steering spindle jacket 30 includes a control module mount 32 that is shaped and sized to receive and attach to a steering column control module (not shown) as is well known. A rotatable steering wheel outer spindle or shaft 31 is disposed in the steering spindle jacket 30 which may be considered to define an operational longitudinal axis A of the steering column 20 and provides a means of mounting a steering wheel (not shown) thereto as is well known.

The steering column 20 may include a first motor drive assembly 38. The first motor drive assembly 38 is configured, when actuated, to cause the steering spindle jacket 30 to extend and retract along axis A. A second motor drive assembly may be included configured to raise and lower the steering support assembly vertically about pivot 41.

In one example, motor drive assembly includes a motor 42 and a screw 44 that is operatively connected to the motor such that operation of the motor causes rotation of the screw. Each of the drive assemblies will be understood to include a mechanism to convert the rotary motion of the screw 44 to a linear motion, such as a threaded rod and nut assembly, as is well known in the art. The motor drive assemblies may be any suitable mechanism to alter the steering column orientation to a user.

Figure 2:
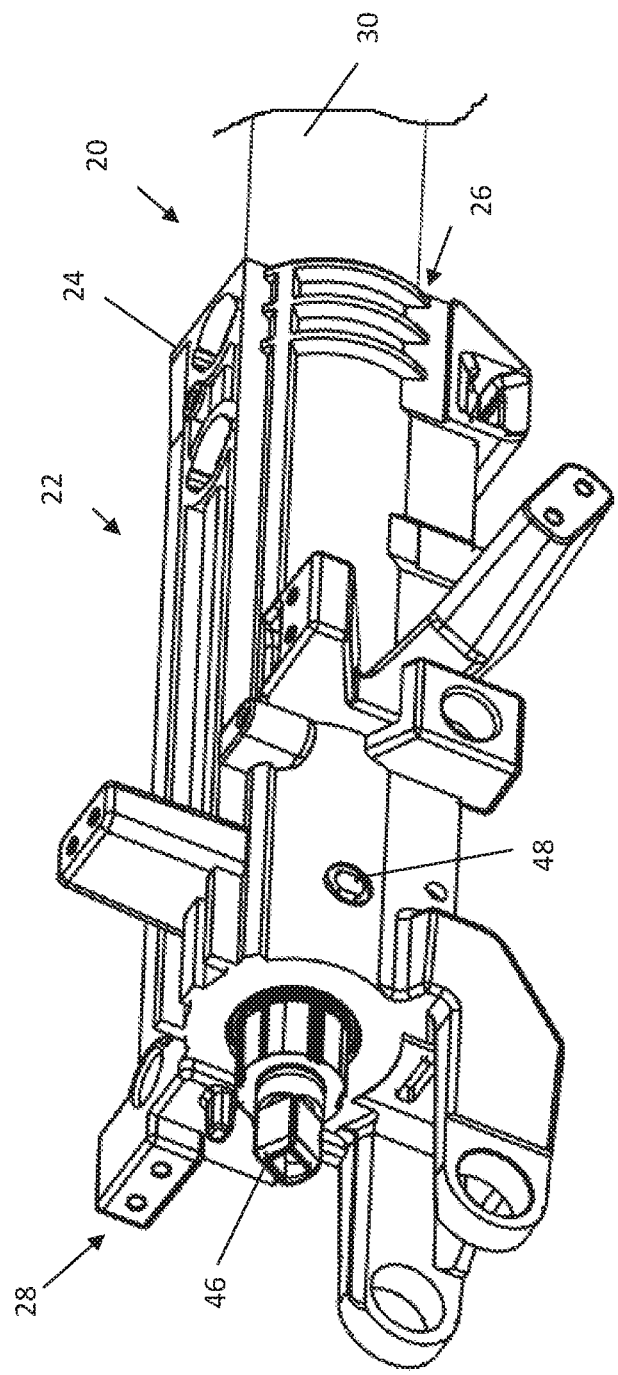
FIG. 2 is a perspective view of a steering column from a distal end with some pouter features removed to show the rocker box, the steering spindle housing, and the outer steering spindle.

FIG. 2 shows the steering column of FIG. 1, with some of the exterior features removed from housing 24 to show some of the interior structure. In particular, support assembly 22 includes a housing 24 that is sized and shaped to receive the steering spindle jacket 30 and permit the steering spindle jacket to move axially inwardly and outwardly relative to the housing.

The steering outer spindle 31 (see FIG. 1) is rotatably disposed in the steering spindle jacket 30 and extends therefrom proximally and extends toward a user positioned within a vehicle occupant compartment. A steering inner spindle 46 extends distally from the steering spindle jacket 30, away from a user. The steering outer and inner spindles 31, 46 operate together to transmit user input to steering wheels of the vehicle. Also, steering outer and inner spindles 31, 46 are configured to permit adjustability to the steering wheel and thus adaptability to the user, according to personal preference, comfort, and so on. In addition, as will explained herein, the steering outer and inner spindles 31, 46 are configured to permit the steering column to be stowed, i.e., moved into a collapsed, contracted position or state whereby more clearance is created in the vehicle cabin to enhance a user's ability to exit and enter the vehicle.

Figure 4:
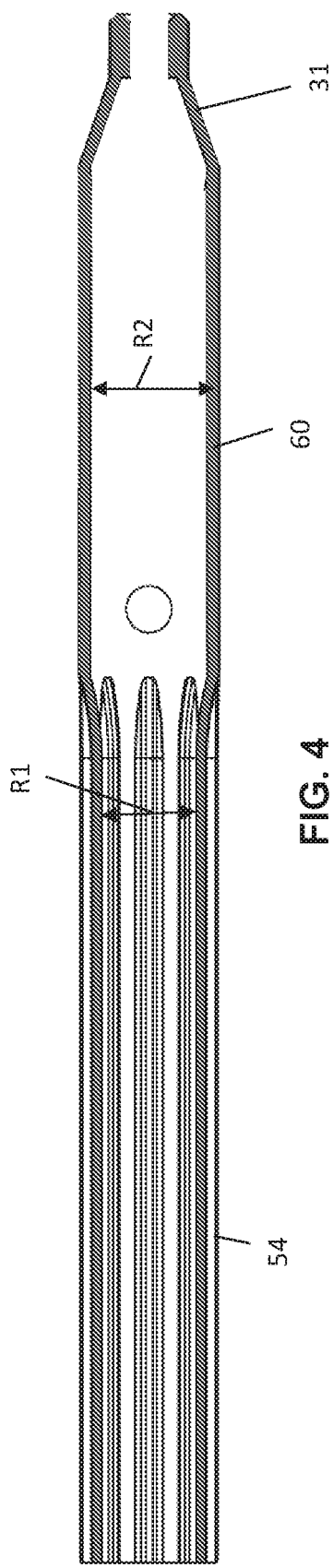
FIG. 4 is a section view of the outer spindle.
Figure 5:
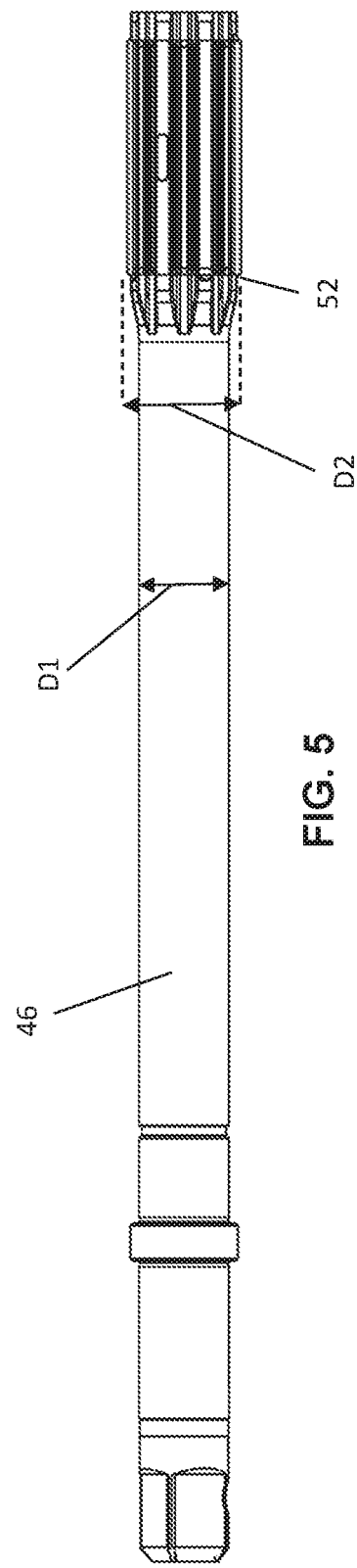
FIG. 5 is a side view of the inner spindle.
Figure 6:
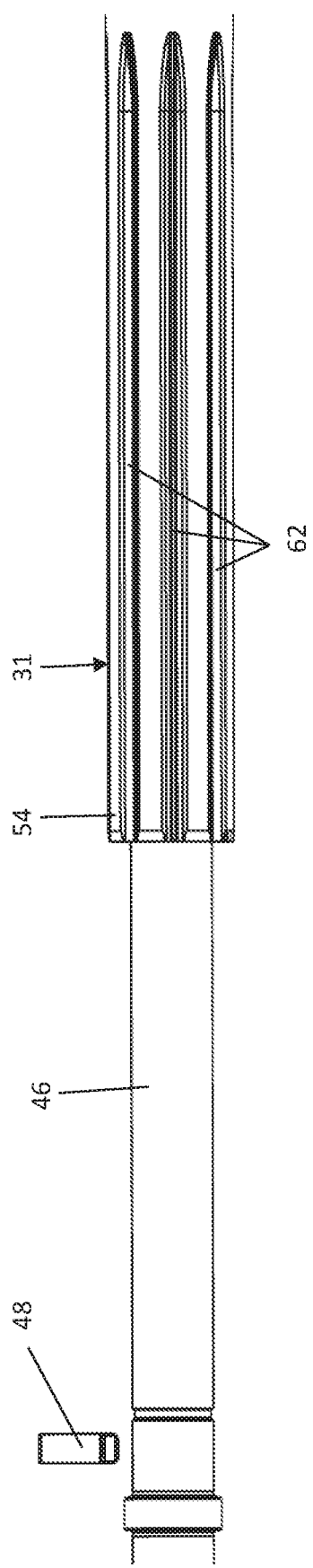
FIG. 6 is a side view of the inner spindle and the outer spindle and pin.

The steering inner spindle 46 includes a portion that has toothing or splines or the like formed on the exterior thereof which may be in the form of a spline shaft that is shaped and sized to cooperate with interior toothing of the outer spindle 31 and which permits axial movement of the inner and outer spindles 46, 31 relative to each other and prevents rotation of the inner spindle relative to the outer spindle when intermeshed or contactingly engaged via the corresponding spline features (See FIGS. 4-6 for example). As will be explained in more detail below, when the inner and outer spindles are not contactingly engaged, as when the steering column is in a collapsed or stowed state, the splines of the inner and outer spindles 46, 31 are disengaged because they do not overlap.

A pin 48 is press fit or otherwise attached to the housing 24 near the distal end 28. The pin 48 is sized and shaped to extend into the interior of the housing (see FIGS. 5-8) with the housing removed to show the relationship of the pin to the spline elements of the steering spindles 31, 46 and thus how the pin interacts with the splines of the outer spindle 31 when the steering column is in a stowed condition. In one embodiment, the pin 48 is located in the housing 24 such that only about the last 10 mm of the distal end of the outer spindle 31 passes the pin when transitioning into the stowed position.

Figure 3:
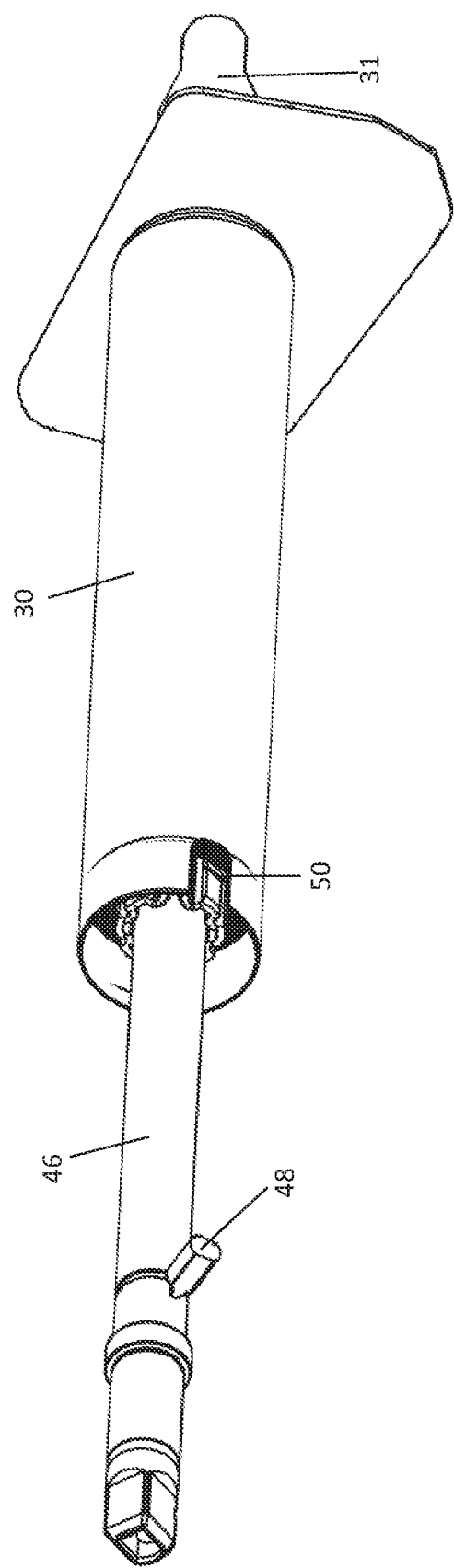
FIG. 3 is a perspective view according to the steering column of FIG. 2 with the rocker box removed.

FIG. 3 shows the steering column of FIG. 2 with the housing 24 hidden to show the steering spindle jacket 30 and portions of the associated steering spindle elements 31, 46 and the pin 48. It should be understood that the pin 48 is shown in the position it occupies once press fit into the housing 24, wherein the housing is hidden to reveal the underlying structure and relative positions of the remaining elements.

Figure 9:
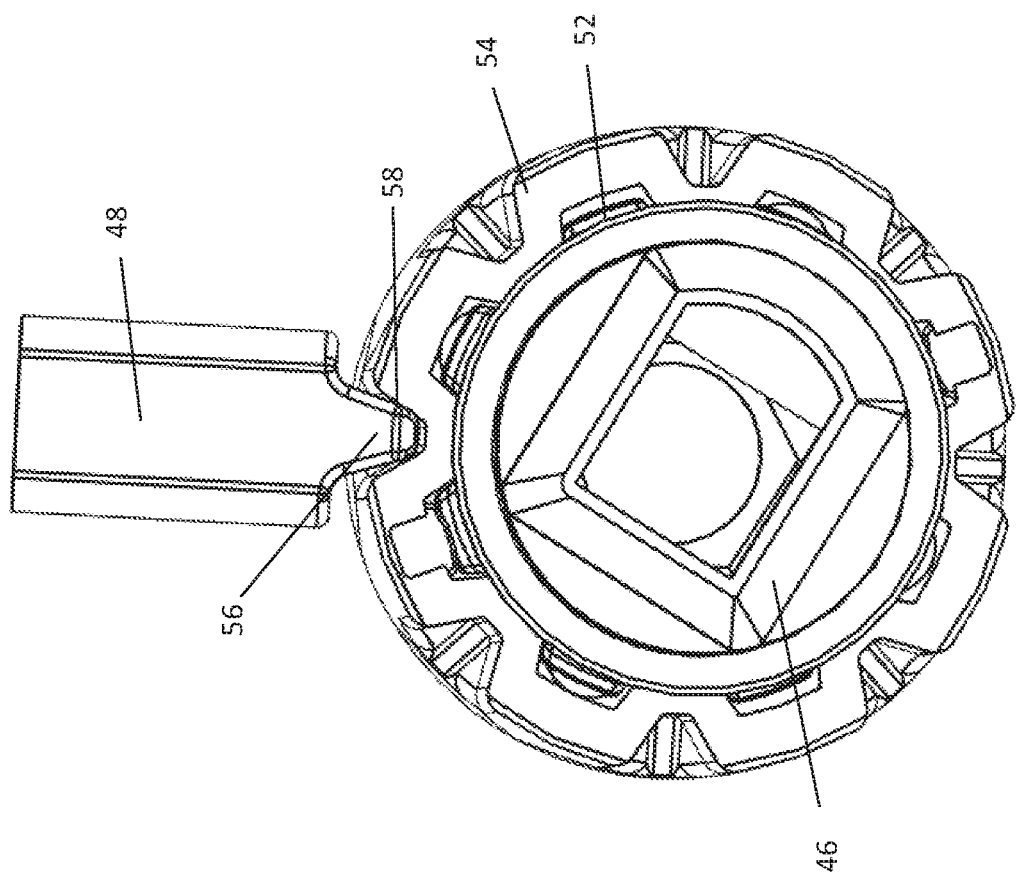
FIG. 9 is an end view of the steering column of FIG. 7 showing the alignment and engagement of the pin and outer steering spindle when the steering column is in a stowed state.

The spindle jacket 30 and steering spindle elements 31, 46 are shown in an unstowed or fully operational state, which is the state whereby steering can be performed by the steering column. In the unstowed state, the steering spindle elements 31, 46 are rotationally fixed to each other by a spline configuration 62, the structure of which is shown in more detail in FIGS. 4-7. In a stowed state the steering inner spindle 46 is moved into the interior of the outer steering spindle 31 and the pin 48 is moved toward and may be accommodated by the slot 50 in the spindle jacket 30. In the collapsed state, the inner and outer spindles are rotationally decoupled. However, the pin 48 engages with the outer spindle 31 as is shown in FIG. 9 to prevent the outer steering spindle 31 and steering wheel from rotating in the stowed state.

An embodiment of the outer steering spindle 31 is shown in FIG. 4 in longitudinal cross section. The outer steering spindle 31 has two main sections, a spline hub portion 54 and an expanded portion 60 that is disposed nearer to the proximal end (see feature 26 in FIG. 1). The spline portion 54 includes internal toothing, teeth, inward projections, or the like characterized by a splined hub radius R1. The expanded, non-splined portion 60 is free of engagement features and is characterized by a non-splined radius R2, wherein R1 is less than R2.

An embodiment of the inner steering spindle 46 is shown in FIG. 5 in a side view. The inner steering spindle 46 is shaped and sized to fit within the outer steering spindle 31. The inner spindle 46 includes a spline shaft portion 52 that is sized and shaped to fit within the spline hub portion 54 of the outer steering spindle 31 so as to move freely in an axial direction and intermesh with the toothed features of the spline hub portion 54 so as to prevent relative rotation of the inner and outer spindles 46, 31 when so meshed. The inner steering spindle 46 has a main shaft diameter D1 and the spline shaft portion 52 has a spline shaft diameter of D2, wherein D2 is greater than D1. In other words, the toothed features of the spline shaft portion 52 extend outwardly from the main surface diameter D1 of the inner shaft 46. When the spline shaft portion 52 is axially within the spline hub portion 54 of the outer shaft 31, the inner and outer shafts 46, 31 are rotationally intermeshed and fixed together rotationally. The engagement of the inner and outer shafts 46, 31 is best shown in FIG. 7.

When the spline shaft portion 52, in the stowed state of the steering column, is axially within the expanded portion 60 of the outer shaft 31, there is no rotational engagement and inner and outer shafts are free to rotate relative to each other, thus no torque is transmitted from one to the other shaft.

One embodiment of the outer steering spindle 31 is shown in FIG. 6, with the inner steering spindle 46 engaged therewith and the pin 48 in position with the steering column in an unstowed state. Specifically, the outer steering spindle 31 includes one or more outer grooves 62 formed on the exterior of the spline hub portion 54. A method for creating both the outer and inner features of the outer steering spindle 31 can form the grooves on the outside and the toothing of the interior of the spindle.

Figure 7:
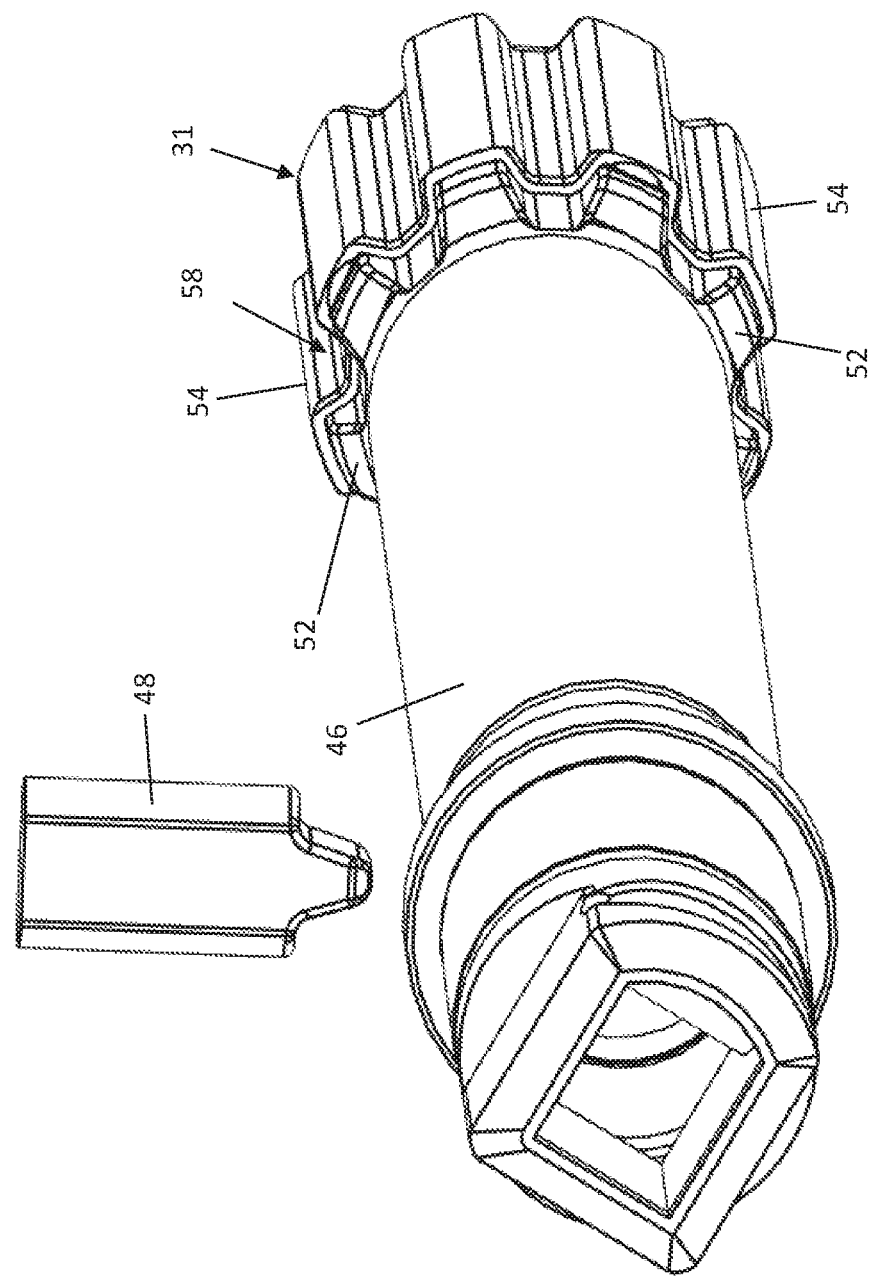
FIG. 7 is a close-up perspective view of the engagement of the outer and inner spindle and pin position relative thereto.

Turning to FIG. 7, the shape of the spline hub portion 54 of the outer spindle 31 intermeshed with the spline shaft portion 52 of the inner steering spindle 46 is shown. In one embodiment, the spline hub portion 54 includes one or more outer grooves (see 62 of FIG. 6) that is sized, shaped, and positioned to receive the pin 48 when the steering column is in a stowed state. The groove that is positioned to receive the pin 48 is a tooth-receiving groove 58 formed on the outer surface or formed by the outer surface of the spline hub portion 54 of the outer spindle 31. The pin 48 and tooth-receiving groove 58 should have complementary shapes to provide a backlash-free or nearly backlash-free engagement. In FIG. 7 the matching shape of the spline hub portion 54 of the outer spindle 31 and spline shaft portion 52 of the inner steering spindle 46 is shown from the perspective of the distal end of the steering column (see FIG. 1).

Figure 8:
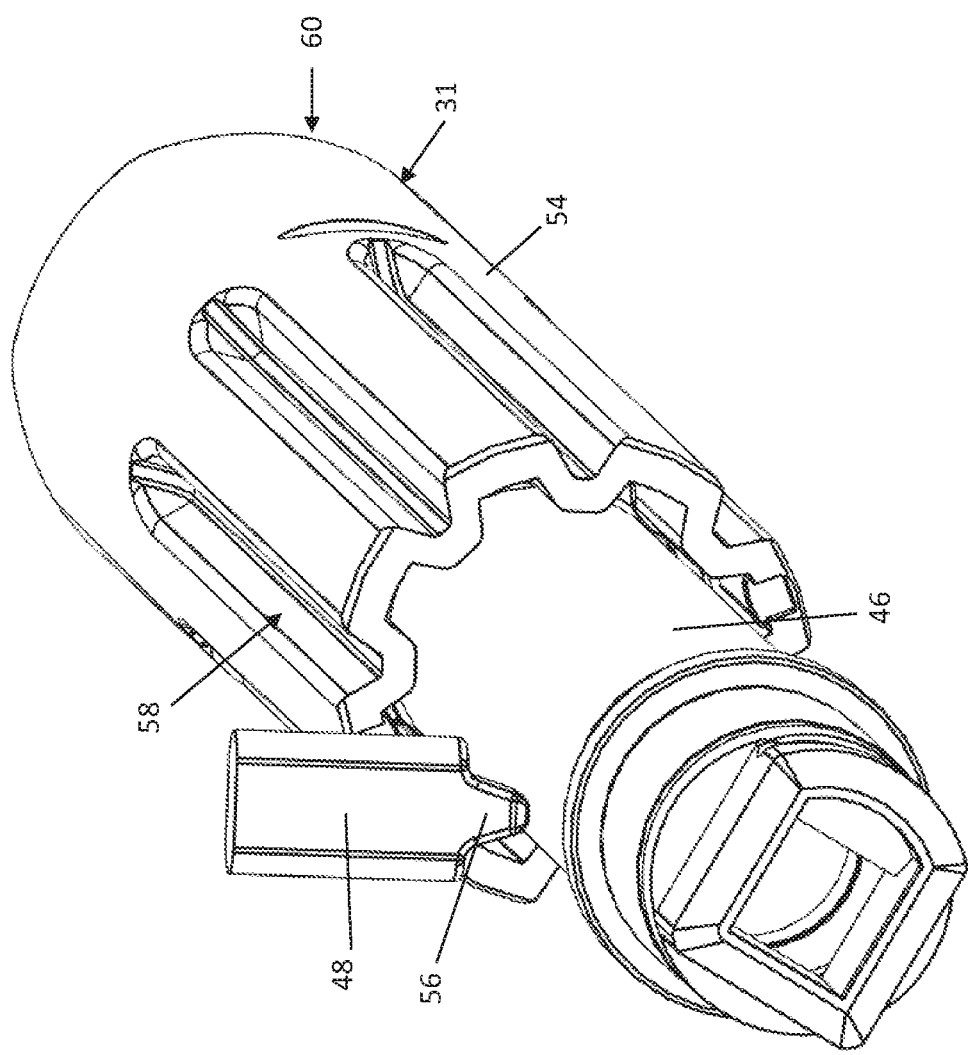
FIG. 8 is a further close-up perspective view of the elements of FIG. 6.

FIG. 8 represents a condition where the steering column is transitioning from a non-stowed state to a stowed state and FIG. 9 represents the stowed state. Specifically, in the process of collapsing or stowing the steering column, the outer spindle 31 is caused to move proximally, i.e., away from a user and toward the inner steering spindle 46. In the context of the present invention, collapsing or stowing refers to adjustment or change in states of the steering column that occurs where there is no collision event, and where no energy absorption takes place, as for example, from changes in steering column geometry or state responsive to a user adjustment process. Also, to be clear, the collapsing or stowing process being discussed herein is not the same as that which occurs during a collision, which involves energy absorption. The spline shaft portion 52 (see FIG. 7) disengages from the spline hub portion 54 of the outer spindle and is positioned within the expanded portion 60 of the outer spindle (see FIG. 4) whereby the outer and inner spindles 31, 46 become rotationally decoupled from one another. In a fully collapsed state, the tooth 56 of pin 48 becomes positioned within the tooth-receiving groove 58 of the outer spindle 31 and prevents rotation of the outer spindle and thus a steering wheel attached to the outer spindle. The shape of the pin 48, which may include a chamfer and rounded edge, engages positively with the tooth-receiving groove 58. In this fashion, the steering wheel is prevented from rotating and can be used to assist the egress of a user from the driving compartment of the vehicle. Reversing the process of collapsing the steering column disengages the pin 48 and reengages the spline shaft portion 52 and spline hub portion 54. In another embodiment, the pin 48 may be multiple pins, each arranged to engage a respective groove 58.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A steering column for a vehicle, comprising:
   a housing;
   a steering spindle jacket disposed within the housing;
   an outer steering spindle disposed at least in part within the steering spindle jacket, the outer steering spindle configured to attach to a steering wheel at a proximal end thereof and including a spline hub portion opposite the proximal end;
   an inner spindle disposed at least in part within the outer steering spindle, the inner spindle including a spline shaft portion shaped and sized to permit axial movement and prevent rotation of the outer steering spindle relative to the inner spindle when the spline hub portion and the spline shaft portions are engaged;
   wherein, in a non-stowed state of the steering column, the spline shaft portion and the spline hub portion are engaged;
   wherein, in a stowed state of the steering column, the spline shaft portion and the spline hub portion are free of engagement; and
   a pin disposed in the housing so as to engage the spline hub portion in the stowed state and prevent rotation of the outer steering spindle and free of engagement with the spline hub portion in the non-stowed state.

2. The steering column of claim 1, wherein the outer steering spindle includes an expanded portion that is sized and shaped to receive the spline shaft portion when in the stowed state.

3. The steering column of claim 2, wherein the expanded portion of the outer steering spindle has an inner radius that is greater than an outer diameter of the spline shaft portion.

4. The steering column of claim 2, wherein the expanded portion is proximal relative to the spline hub portion.

5. The steering column of claim 1, wherein the spline shaft hub includes internal toothing and at least one external groove.

6. The steering column of claim 5, wherein the spline shaft hub includes a plurality of external grooves.

7. The steering column of claim 5, wherein the pin is sized and shaped to engage with the at least one external groove and prevent rotation of the outer steering spindle.

8. The steering column of claim 7, wherein the pin comprises a tooth portion that has a complementary shape to the at least one external groove.

9. The steering column of claim 8, wherein the pin includes one or both of a chamfer and a rounded edge.

10. The steering column of claim 1, wherein the steering spindle jacket is movable axially within the housing.

11. The steering column of claim 10, wherein the outer steering spindle is configured to move axially with the steering spindle jacket.

12. The steering column of claim 11, wherein the outer steering spindle is configured to rotate within the steering spindle jacket.

\* \* \* \* \*